Jan. 3, 1956 W. A. NORRIS 2,729,436
COOLER
Filed Jan. 15, 1954 3 Sheets-Sheet 1
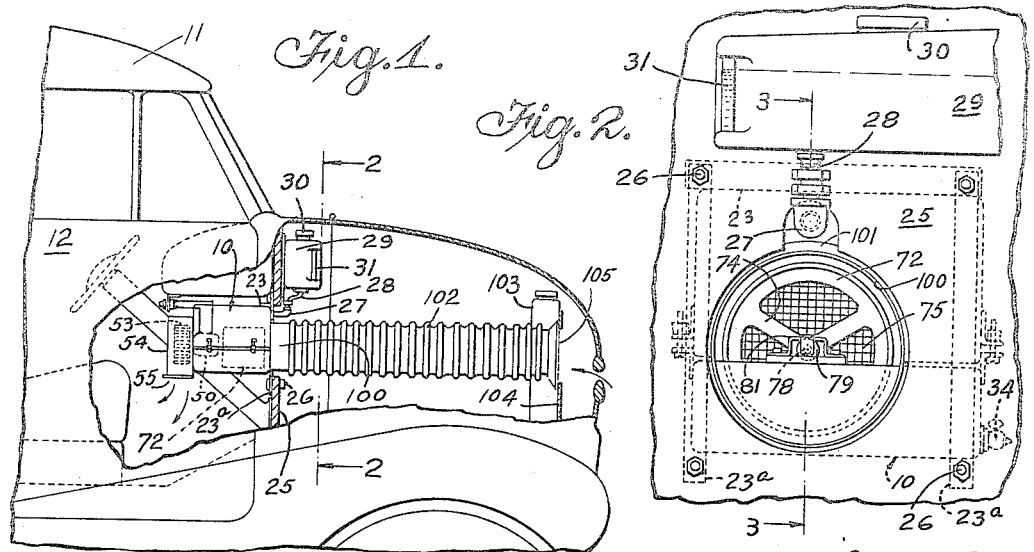
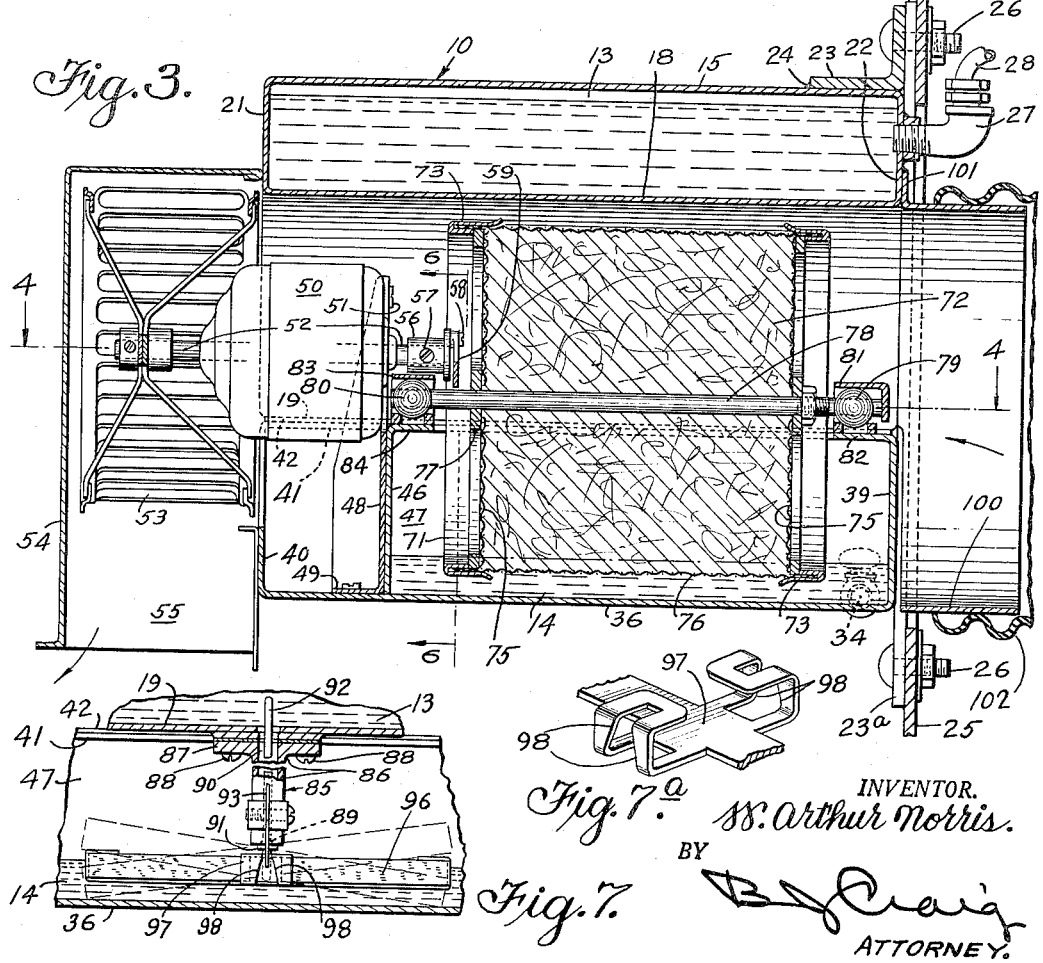
INVENTOR.
W. Arthur Norris.
BY
B. J. Craig
ATTORNEY.

Jan. 3, 1956 W. A. NORRIS 2,729,436
COOLER
Filed Jan. 15, 1954 3 Sheets-Sheet 2
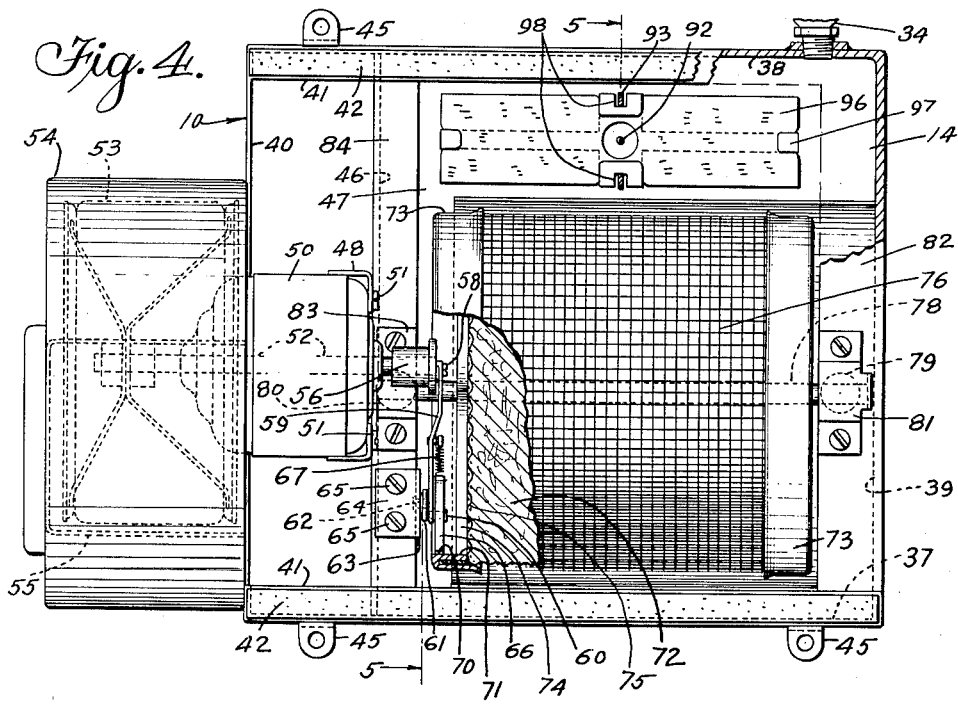
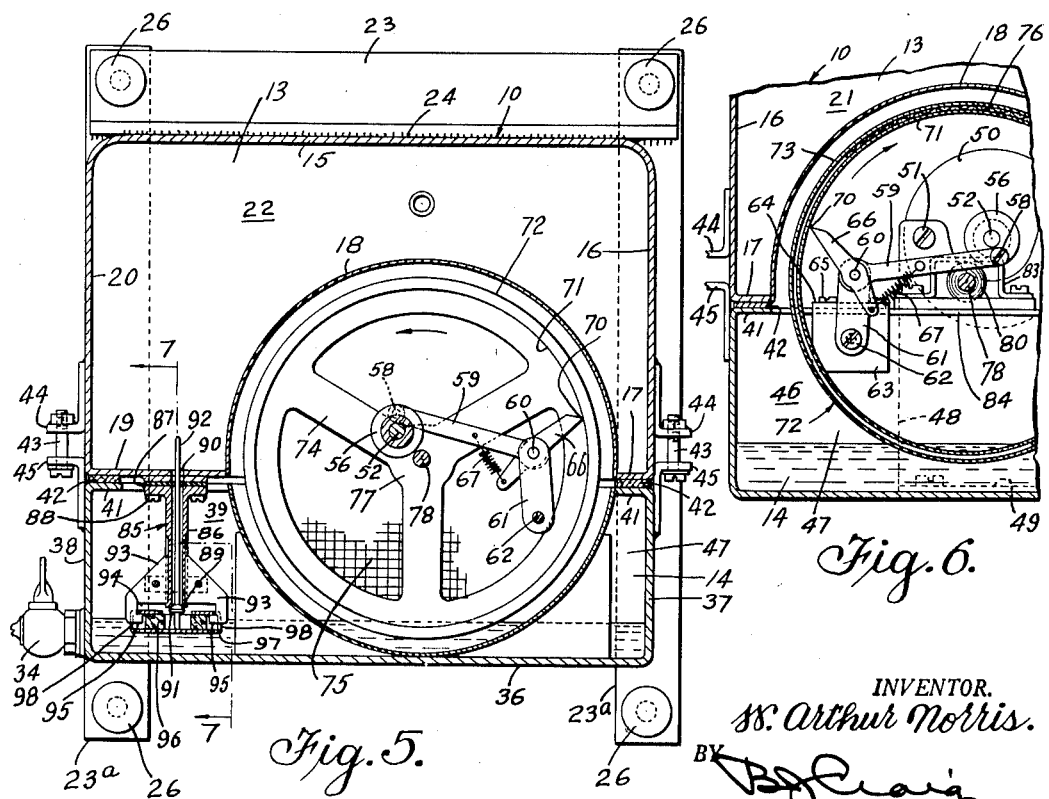
INVENTOR.
W. Arthur Norris.
BY
ATTORNEY.

Jan. 3, 1956 W. A. NORRIS 2,729,436
COOLER
Filed Jan. 15, 1954 3 Sheets-Sheet 3
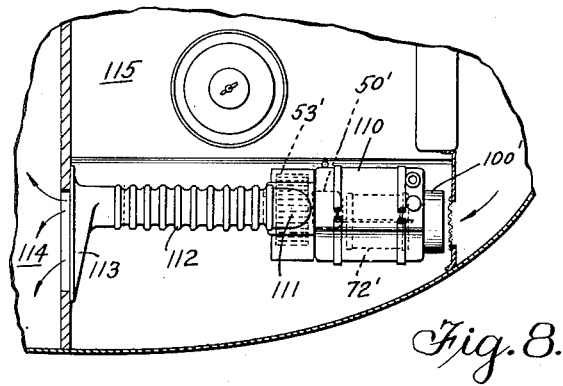
Fig. 8.
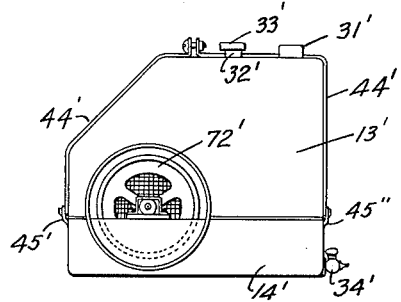
Fig. 9.
Fig. 10.
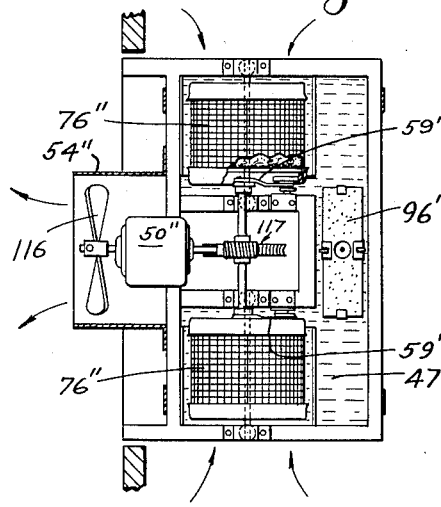
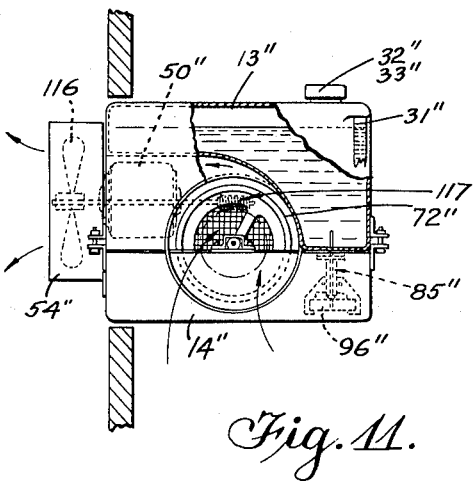
Fig. 11.
Fig. 12.
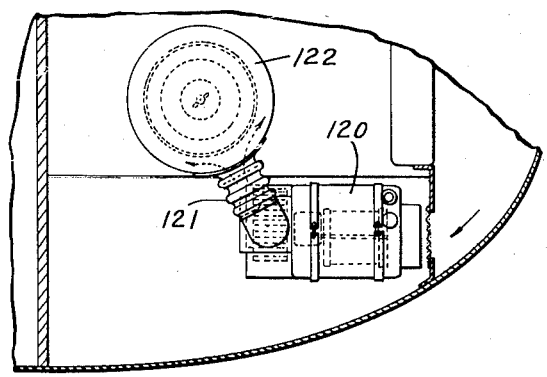
INVENTOR.
W. Arthur Norris.
BY
B. J. Craig
ATTORNEY.

United States Patent Office 2,729,436
Patented Jan. 3, 1956

2,729,436

COOLER

William Arthur Norris, Alhambra, Calif.

Application January 15, 1954, Serial No. 404,177

5 Claims. (Cl. 261—24)

This invention relates to a cooler.

The general object of the invention is to provide an improved cooler which is particularly adapted for use in motor vehicles.

A more specific object of my invention is to provide a novel vehicle cooler which is highly efficient and compact and which can be economically manufactured and readily installed.

Another object of the invention is to provide a vehicle cooler including a novel housing.

A further object of the invention is to provide a novel cage for holding water absorbing material.

A further object of the invention is to provide a novel means for rotating the cage member of a cooler.

A further object of the invention is to provide a novel valve means for controlling the flow of water to a cooler.

Another object of the invention is to provide a cooler including a novel arrangement of twin cages for moistening the air passing through the cooler.

A further object of the invention is to provide a novel humidifier for supplying moist air to the intake manifold of an internal combustion engine.

Other objects and advantages of my invention will be apparent from the following description taken in connection with the accompanying drawings, wherein:

Fig. 1 is a fragmentary side elevation with parts in section showing my invention;

Fig. 2 is an enlarged section taken on line 2—2 of Fig. 1;

Fig. 3 is an enlarged longitudinal section taken on line 3—3, Fig. 2;

Fig. 4 is a section taken on line 4—4, Fig. 3;

Fig. 5 is a section taken on line 5—5, Fig. 4;

Fig. 6 is a section taken on line 6—6, Fig. 3;

Fig. 7 is a section taken on line 7—7, Fig. 5;

Fig. 7a is an isometric view showing the float support member;

Fig. 8 is a fragmentary horizontal section with parts in plan showing a modification of my invention;

Fig. 9 is an enlarged front elevation showing the modification;

Fig. 10 is a horizontal section with parts in plan showing a further modification;

Fig. 11 is an end view with parts broken away and parts in section showing the further modification; and Fig. 12 is a view similar to Fig. 8 showing a still further modification.

Referring to the drawing by reference characters the invention is shown as embodied in a cooling unit which is indicated generally at 10. As shown, the unit is disposed in a motor vehicle 11, and is shown as disposed adjacent to the driver's compartment 12. The unit includes an upper tank member 13 and a lower member 14. The upper tank member 13 includes a body having a top 15, a side wall 16, a planar bottom portion 17, a second curved bottom portion 18 which is semi-cylindrical, a third planar bottom portion 19 and a side wall 20. The body includes ends 21 and 22.

The body is provided with an angle member 23 which extends across the top 15 to which it is welded as at 24. The angle 23 is secured to the front partition or fire wall 25 of the driver's compartment by bolts 26 with depending supporting straps 27 interposed between the angle 23 and the wall 25.

The tank 13 is connected by an angle fitting 27 to a flexible conduit such as a hose 28 which latter is connected to a storage tank 29 which has a filling spout 30, a glass water depth indicating gauge 31 and a drain outlet 34.

The lower member 14 consists of a bottom 36 having sides 37 and 38 and having ends 39 and 40. The sides 37 and 38 are provided with in-turned flanges 41 which are aligned with the bottom portions 17 and 19 of the tank member. Gaskets 42 are disposed between the members 17, 19 and 41 to provide a seal. The members 13 and 14 are held together by bolts 43 which engage flanges 44 and 45 on the members 13 and 14.

The member 14 includes a partition 46 which in conjunction with the end 39 forms a tank 47. The partition 46 supports a plate 48 which has a supporting flange 49 secured to the bottom 36. The plate 48 supports a motor 50 which is held in place by screws 51.

At one end the shaft 52 of the motor supports a sirocco fan 53 which rotates in a housing 54 and which has a discharge portion 55 through which air discharged from the cooling unit. The motor shaft 52 opposite the fan 53 has a collar 56 secured thereto by a set screw 57.

The collar 56 has an eccentric pin 58 thereon. The eccentric pin pivotally supports one end of a link 59. The other end of the link 59 is pivoted at 60 to a link 61 which in turn is pivoted at 62 to a bracket 63 which has a flange 64 which latter is secured to the partition 46 by screws 65. The pin 60 pivotally supports a dog 66 which at one end is engaged by one end of a spring 67. The other end of the spring 67 engages the link 59. The dog has a sharpened end 70 which engages the inner wall of a rim 71 of a foraminous cage or container 72 which has a second rim 73 spaced from the first rim.

The rims 71 and 73 consist of members having spokes 74. The rims are covered with a wire mesh member 75 and the rims are connected by a cylindrical mesh member 76. The rims 71 and 73 include hubs 77 mounted on a shaft 78 which carries bearing members 79 and 80 at its ends. A bracket 81 mounted on a flange 82 on one of the ends 39 supports the bearing 79 while the bearing 80 is mounted in a bracket 83 disposed on a flange 84 on the partition 46.

The construction is such that when the motor 50 is operated it will rotate the fan 53 to draw air through the tank member 13 and discharge it through the outlet 55. The rotating motor shaft 52 will rotate the crank pin 58 and will rock the dog 66, the sharpened end 70 of which is held in engagement by the spring 67 with the interior of the rim 71. This will cause the rim 71 to be driven slowly step-by-step.

The container 72 is filled with water absorbing material such as excelsior and in order to maintain this excelsior or other material in moist condition water is conducted from the tank 13 to the tank 47 through a valved conduit indicated generally at 85. The conduit includes a body 86 having a flange 87 secured to the tank by screws 88. A valve seat 89 is provided at the lower end of the body. A passage 90 conducts fluid from the tank to the valve seat. The valve seat is engaged by a valve 91 mounted on a stem 92. The body 85 supports vanes 93 which are slotted at 94 at the lower ends and have opposed ears 95 adjacent to the slot. The slot 94 receives a float member 96 which is buoyant and which includes a central metal float support member 97 (Fig. 7a) which is slotted each side as at 98 to receive the wings 93. The ears 95 engage the lower surface of the member 97 to prevent displacement of the float.

The slots 98 diverge downwardly so that the float is permitted to rock to the broken line positions shown in Fig. 7 to thus compensate for tilting of the vehicle. When the tank 47 contains water to the desired depth the float 96 will hold the valve 91 in closing position. When the water level in the tank 47 drops the float 96 will move downwardly, thus allowing more water to enter the tank.

The lower member 14 is provided with a collar 100 which is held in place by a flange 101 which engages the tank 13. The collar 100 receives a flexible tube 102 which extends to the front of the automobile adjacent to the radiator 103 where it is held in position by a bracket 104. A screen 105 prevents entrance of trash into the tube 102.

In Figs. 8 and 9 I show a modification of my invention, wherein the conditioner 110 is similar to the conditioner previously described and wherein parts similar to those previously mentioned are indicated by single primed reference numerals. In the modification the outlet is connected by an elbow 111 with a flexible tube 112 which communicates with an outlet member 113 which latter communicates with the interior 114 of the vehicle. The modification shown in Figs. 8 and 9 is preferably disposed along the engine 115 of the vehicle. In the modification the parts 13' and 14' are held together by straps 44' which engage ears 45" on the bottom member 14'.

In Figs. 10 and 11 I show a further modification wherein parts similar to those previously described are designated by double primed reference numerals. In this further modification the motor 50" drives a bladed fan 116 and also drives a reduction gear 117 which drives a link mechanism 59" to rotate cages 76" arranged at each side. A valve controlled mechanism 85" supplies water to the conditioner 14".

In Fig. 12 the conditioner 120 similar to the conditioner 110 mentioned above has its outlet hose 121 connected to the carburetor intake manifold 122 of an internal combustion engine so that moist air may be delivered to the intake manifold to cause better engine performance.

In the operation of my invention, operation of the motor will cause air to be drawn through the cage 76 and to be discharged into the vehicle or elsewhere. The cage also will be rotated causing the moisture absorbing material to be wetted to thus moisten and to, at the same time, reduce the temperature of the air passing through the cage. Slow rotation of the cage as provided by my invention prevents droplets of water being carried into the cage and then passing into the air stream.

A portion of the air column passes around the cage so that over-moistening of the air column is prevented.

From the foregoing description it will be apparent that I have invented a novel cooler which can be economically manufactured and which is highly efficient for its intended purpose.

Having thus described my invention, I claim:

1. In a vehicle cooler, a body including an upper tank member and a lower receptacle member, said upper tank member including a body having ends, a top, a side wall and a bottom, said bottom including planar edge portions and an intermediate semi-cylindrical portion, the lower receptacle member including ends, sides and a bottom, said sides having flanges engaging the planar bottom portions of the tank member, means securing the members together, said lower receptacle member having a partition, a plate mounted on said partition, a motor mounted on said plate, a shaft on the motor, a fan on the motor shaft, a housing for the fan, means to secure the housing to the body, said fan housing having a discharge outlet, a foraminous cage rotatable in said body, water absorbing material in said cage, means driven by said motor to rotate the cage, said partition and the lower member bottom, ends and one side forming a container, a conduit connecting said tank and said container, the lower portion of said cage being disposed below the liquid level in said container, a valve controlling passage of fluid through said conduit and a tilting valve operating float member in said container.

2. In a vehicle cooler, a body including a receptacle member having a partition, a plate mounted on said partition, a motor mounted on said plate, a shaft on the motor, a fan on the motor shaft, a housing for the fan, means to secure the housing to the body, said housing having a discharge outlet, a collar on the shaft, an eccentric pin on said collar, a foraminous cylindrical cage rotatably mounted in said body, water absorbing material in said cage, said cage including a cylindrical rim, a bracket on said partition, a link pivoted on said bracket, a dog, a pivot pin on said link supporting said dog on said link, said dog having a sharpened end disposed to engage the inner wall of said rim, a second link pivoted to said bracket pivot pin at one end and pivotally connected to said eccentric pin at its other end, a tension spring on said second link and connected to said dog at a point on the dog remote from said sharpened end whereby when the motor rotates the rim will be moved step-by-step, said partition and the receptacle member bottom, ends and one side forming a container in which the cage is disposed, and means to supply liquid to said container.

3. In a vehicle cooler, a body including an upper tank member and a lower receptacle member, said lower receptacle member having a partition, a plate mounted on said partition, a motor mounted on said plate, a shaft on the motor, a fan on the motor shaft, a housing for the fan, means to secure the housing to the body, said housing having a discharge outlet, a collar on the shaft, an eccentric pin on said collar, a foraminous cylindrical cage rotatably mounted in said body, water absorbing material in said cage, said cage including a cylindrical rim, a bracket on said partition, a link pivoted on said bracket, a dog, a pivot pin on said link supporting said dog on said link, said dog having a sharpened end disposed to engage the inner wall of said rim, a second link pivoted to said bracket pivot pin at one end and pivotally connected to said eccentric pin at its other end, a tension spring on said second link and connected to said dog at a point on the dog remote from said sharpened end whereby when the motor rotates the rim will be moved step-by-step, said partition and the lower receptacle member bottom, ends and one side forming a container, a conduit connecting said tank and said container, a float controlled valve controlling passage of liquid from said tank to said container, the lower portion of said cage being disposed below the liquid level in said container, and means to supply liquid to said tank.

4. In a vehicle cooler, a body including an upper tank member and a lower receptacle member, said upper tank member including a body having ends, a top, a side wall and a bottom, said bottom including planar edge portions and an intermediate semi-cylindrical portion, the lower receptacle member including ends, sides and a bottom, said sides having flanges engaging the planar bottom portions of the tank member, means securing the members together, said lower receptacle member having a partition, a plate mounted on said partition, a motor mounted on said plate, a shaft on the motor, a fan on the motor shaft, a housing for the fan, means to secure the housing to the body, said housing having a discharge outlet, a collar on the shaft, an eccentric pin on said collar, a foraminous cylindrical cage rotatably mounted in said body, water absorbing material in said cage, said cage including a cylindrical rim, a bracket on said partition, a link pivoted on said bracket, a dog, a pivot pin on said link supporting said dog on said link, said dog having a sharpened end disposed to engage the inner wall of said rim, a second link pivoted to said bracket pivot pin at one end and pivotally mounted to said eccentric pin at its other end, a tension spring on said second link and connected to said dog at a point on the dog remote from said sharpened end whereby when the motor rotates the rim will be moved step-by-step, said partition and the lower receptacle member bottom, ends and one side forming a container, a conduit connecting said tank and said container, a float controlled valve controlling passage of liquid from said tank to said container, the lower portion of said cage being disposed below the liquid level in said container, and means to supply liquid to said tank.

5. In a humidifier for an internal combustion engine, a body including an upper tank member and a lower receptacle, said upper tank member including a body having ends, a top, a side wall and a bottom, said bottom including planar edge portions and an intermediate semi-cylindrical portion, the lower receptacle member including ends, sides and a bottom, said side having flanges engaging the planar bottom portions of the tank member, means securing the members together, said lower receptacle member having a partition, a plate mounted on said partition, a motor mounted on said plate, a shaft on the motor, a fan on the motor shaft, a housing for the fan, means to secure the housing to the body, said fan housing having a discharge outlet, a foraminous cage rotatable in said body, water absorbing material in said cage, means driven by said motor to rotate the cage, said partition and lower receptacle member bottom, ends and one side forming a container, a conduit connecting said tank and said container, the lower portion of said cage being disposed below the liquid level in said container, a valve controlling passage of fluid through said conduit, a float member in said container, means loosely connecting the float member and valve to operate the valve, and means to connect the fan housing discharge outlet to an engine carburetor.

References Cited in the file of this patent

UNITED STATES PATENTS

| | | |
|---|---|---|
| 258,454 | Mansur | May 28, 1882 |
| 1,309,254 | Macfadden | July 8, 1919 |
| 1,409,947 | Haggard | Mar. 21, 1922 |
| 1,432,157 | Cox | Oct. 17, 1922 |
| 1,798,916 | Tittensor | Mar. 31, 1931 |
| 2,265,500 | Stuart | Dec. 9, 1941 |
| 2,407,104 | Schmied | Sept. 3, 1946 |
| 2,432,755 | Hanson | Dec. 16, 1947 |
| 2,495,969 | Hoffman | Jan. 31, 1950 |
| 2,669,319 | Inglesby | Feb. 16, 1954 |
| 2,673,079 | Plunk | Mar. 23, 1954 |